US006541734B2

(12) United States Patent
Shimogama

(10) Patent No.: US 6,541,734 B2
(45) Date of Patent: Apr. 1, 2003

(54) ARC WELDING APPARATUS

(75) Inventor: Shigeru Shimogama, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 26 days.

(21) Appl. No.: 09/813,318

(22) Filed: Mar. 21, 2001

(65) Prior Publication Data

US 2001/0025836 A1 Oct. 4, 2001

(30) Foreign Application Priority Data

Mar. 22, 2000 (JP) ....................................... 2000-079758

(51) Int. Cl.[7] ................................................ B23K 9/10
(52) U.S. Cl. ..................................... 219/125.1; 219/74
(58) Field of Search ........................ 219/125.1, 124.34, 219/125.11, 125.12, 130.5, 72, 74, 132; 901/42

(56) References Cited

U.S. PATENT DOCUMENTS

| | | | | |
|---|---|---|---|---|
| 4,578,562 A | * | 3/1986 | Lindstrom et al. ........ | 219/125.1 |
| 4,959,523 A | * | 9/1990 | Fihey et al. ............. | 219/125.1 |
| 5,149,940 A | * | 9/1992 | Davis et al. ............. | 219/132 |
| 5,440,099 A | * | 8/1995 | Smith ..................... | 219/125.1 |
| 6,118,093 A | * | 9/2000 | Hong ...................... | 901/42 |

FOREIGN PATENT DOCUMENTS

JP            11-77309           3/1999

* cited by examiner

*Primary Examiner*—Clifford C. Shaw
(74) *Attorney, Agent, or Firm*—Wenderoth, Lind & Ponack, L.L.P.

(57) ABSTRACT

An arc welding apparatus comprising a combination of a teaching-playback robot and an arc welding power source is provided. Even when, in changing a welding method, one welding power source for one welding method is replaced by another welding power source for another welding method, the welding apparatus does not require an adjustment between a robot controller and the latter arc welding power source for consistency between them. The arc welding apparatus comprises a teaching-playback robot comprising a robot body and a robot controller and a welding power source including a controller. The robot controller and the controller of the welding power source both have a communication controller, and communicate with each other using a digital signal. On the basis of information on the welding method transmitted from the welding power source, the welding method is automatically set into the robot controller.

15 Claims, 11 Drawing Sheets

Fig. 3

(A) Communication Command (Robot → Welding Power Source)

| Command Name | Code | W | Attached Data |
|---|---|---|---|
| Communication ACK | 41 | 0 | Answer when normally received |
| Communication NAK | 42 | 0 | Answer when abnormally received |
| Request for Sending | 43 | 1 | Command data of welder to be sent |
| "Good Morning" (Communication Start) | 44 | 0 | Permission for communication |
| • • • • | | | |

(B) Communication Command (Welding Power Source → Robot)

| Command Name | Code | W | Attached Data | | | | | | | | | |
|---|---|---|---|---|---|---|---|---|---|---|---|---|
| Communication ACK | 71 | 0 | | | | | | | | | | |
| Communication NAK | 72 | 0 | | | | | | | | | | |
| Request for Sending | 73 | 1 | Command Code of Requested Data at Robot | | | | | | | | | |
| Communication Test | 74 | 0 | | | | | | | | | | |
| Apparatus ID Code | 75 | 1 | Unfixed | | | | | | | | | |
| Welding Current (Lower 8 Bits) | 76 | 1 | 0 - 1500A (2A / 1Bit) | | | | | | | | | |
| Welding Current (Upper 8 Bits) | 77 | 1 | | | | | | | | | | |
| Welding Voltage | 78 | 1 | 0.0 - 51.0V (0.2V / 1Bit) | | | | | | | | | |
| Welding Speed | 7A | 1 | 0.0 - 22.5m/min (1.0m / min / 1Bit) | | | | | | | | | |
| Wire Diameter Welding Method | 7B | 1 | Diameter | D7 | D6 | D5 | D4 | Method | D3 | D2 | D1 | D0 |
| | | | φ 0.6 | 0 | 0 | 0 | 0 | $CO_2$ | 0 | 0 | 0 | 0 |
| | | | φ 0.8 | 0 | 0 | 0 | 1 | MAG | 0 | 0 | 0 | 1 |
| | | | φ 0.9 | 0 | 0 | 1 | 0 | MIG | 0 | 0 | 1 | 0 |
| | | | φ 1.0 | 0 | 0 | 1 | 1 | Puls MAG | 0 | 0 | 1 | 1 |
| | | | φ 1.2 | 0 | 1 | 0 | 0 | DPuls MAG | 0 | 1 | 0 | 0 |
| | | | φ 1.4 | 0 | 1 | 0 | 1 | Puls $CO_2$ | 0 | 1 | 0 | 1 |
| | | | φ 1.6 | 0 | 1 | 1 | 0 | | | | | |
| | | | φ 2.0 | 0 | 1 | 1 | 1 | | | | | |
| Wire Material | 7C | 1 | Material | D7 | D6 | D5 | D4 | Type | D3 | D2 | D1 | D0 |
| | | | Mild Steel | 0 | 0 | 0 | 0 | A | 0 | 0 | 0 | 0 |
| | | | Stain-less Stl. | 0 | 0 | 0 | 1 | B | 0 | 0 | 0 | 1 |
| | | | Alloy Almi. | 0 | 0 | 1 | 0 | C | 0 | 0 | 1 | 0 |
| | | | Pure Almi. | 0 | 0 | 1 | 1 | D | 0 | 0 | 1 | 1 |
| | | | Mild S. FCW | 0 | 1 | 0 | 0 | E | 0 | 1 | 0 | 0 |
| | | | SUS FCW | 0 | 1 | 0 | 1 | F | 0 | 1 | 0 | 1 |
| Wire Feed Motor Rotating Speed | 7D | 1 | 0 – 255rpm (1rpm / 1Bit) | | | | | | | | | |
| • • • • | | | | | | | | | | | | |

Fig. 8
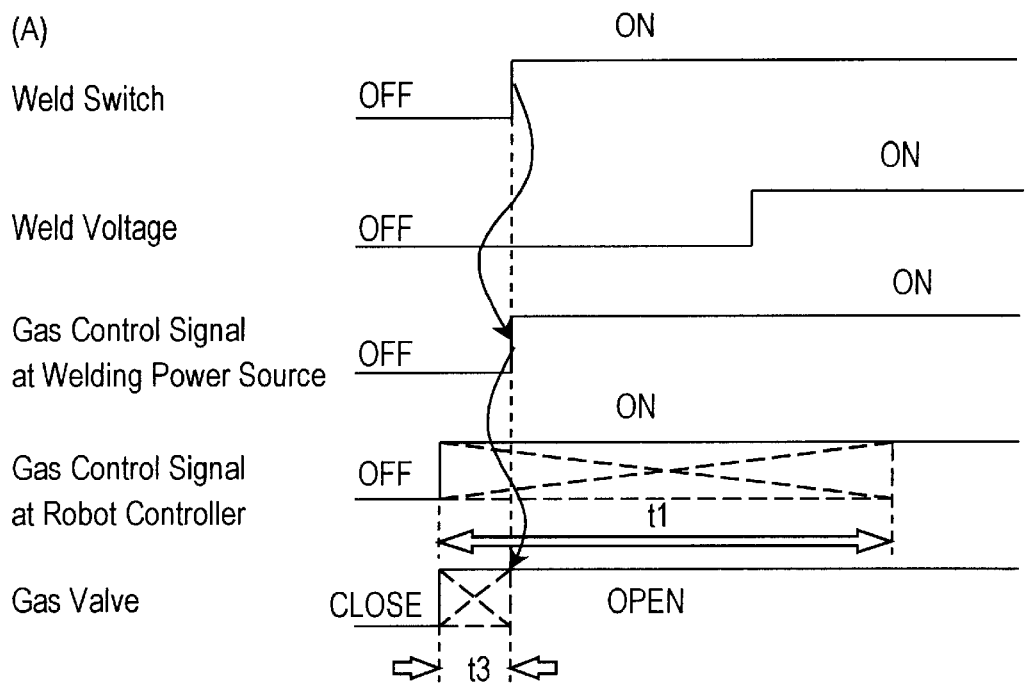
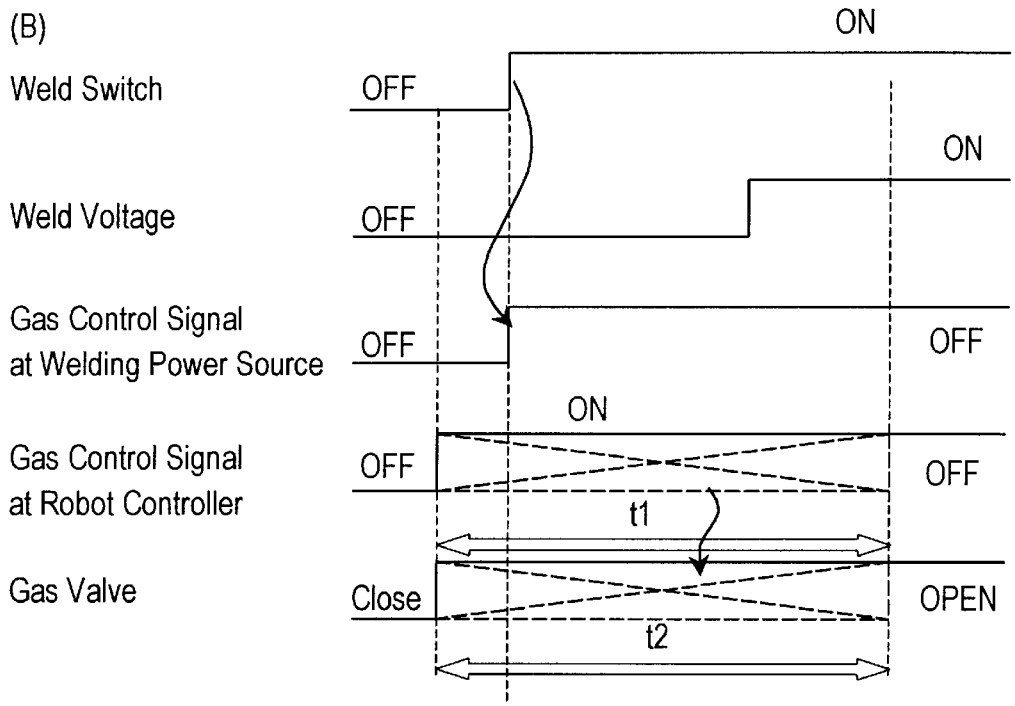

Fig. 9
(A)
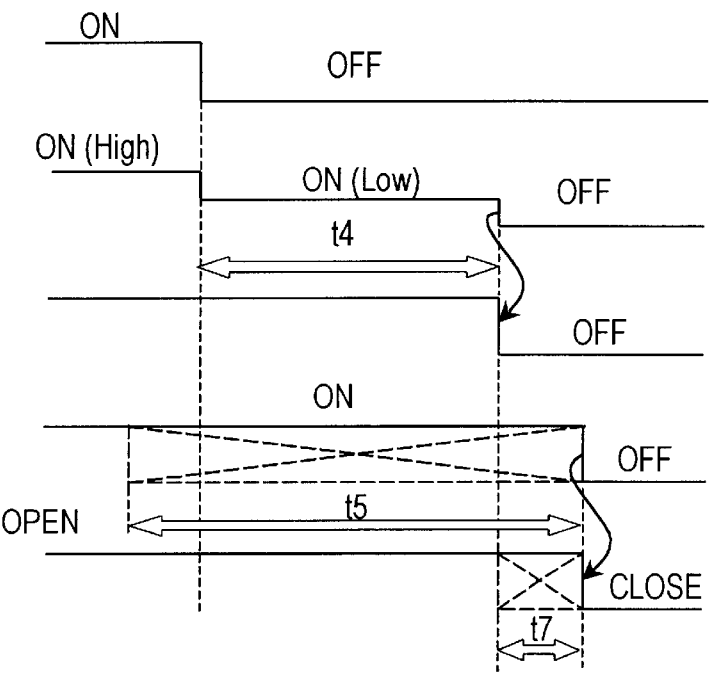
(B)
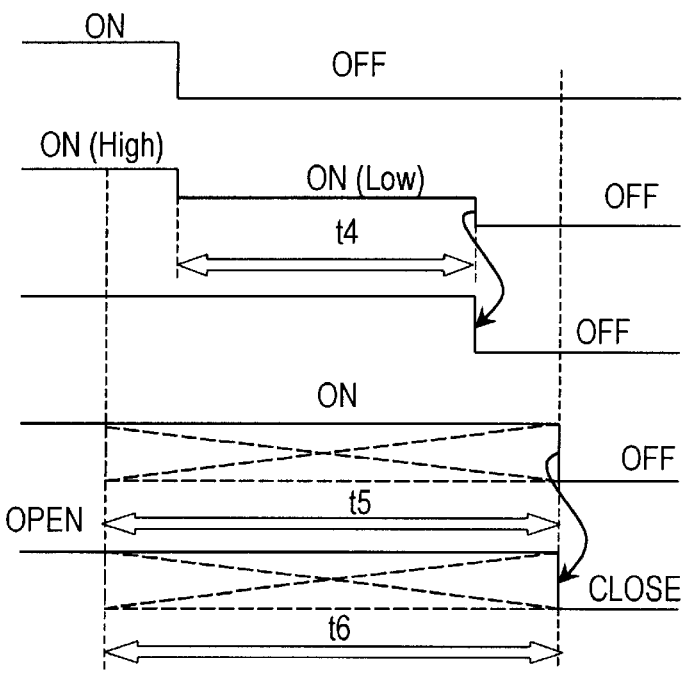

ARC WELDING APPARATUS

FIELD OF THE INVENTION

The present invention relates to a gas-shielded arc welding apparatus comprising a combination of a teaching playback robot and an arc welding power source.

BACKGROUND OF THE INVENTION

Gas-shielded arc welding has mainly used a helium gas, an argon gas, a carbon dioxide gas, or a mixture of these gases as shielding gas for protecting a welded part from ambient atmosphere. Depending on the various gases, there are a metal inert gas (MIG) arc welding method, a $CO_2$ gas shielded arc welding method ($CO_2$ arc welding method), and a metal active gas (MAG) arc welding method. A pulsed arc welding method in which pulse current is periodically made to flow is also known.

Each arc welding method employs a welding power source appropriate to the arc welding method. When welding is performed using a combination including a teaching playback robot (hereinafter simply referred to as a robot), an adjustment for providing consistency between a robot control apparatus and an arc welding power source is required for each arc welding method. This adjusting operation is required every time the combination with the robot is changed to use another welding power source for a different welding method.

An arc welding apparatus comprises a shielding gas solenoid valve and a shielding gas supply controller in order to continuously supply the shielding gas to a shielded part for a certain period before welding, during the welding, and for a certain period after the welding. Before welding work is performed, generally, a shielding gas flow rate is adjusted to a reasonable amount for preparation of the task. A gas flow rate adjuster mounted to a gas cylinder or a gas supply pipe performs this adjustment of the shielding gas flow rate. Most of gas flow rate adjusters to be mounted to the gas cylinder have a structure integrally combined with a gas-pressure regulating valve. The gas flow rate adjuster is generally deposited away from the gas solenoid valve and a gas controller. Because the adjustment of the gas flow rate requires experimentation with the gas supply regardless of the welding, the welding apparatus includes a gas check switch used for supplying gas experimentally. The gas check switch has a function of switching between "supply" and "stop" of the gas. However, if the switch is left set on the "supply" side, the shielding gas continues to be supplied regardless of the welding.

Japanese Patent Laid Open No. 11-77309 discloses a gas-shielded arc welding apparatus including a stop mechanism of shielding gas supply for preventing undesired supply of the shielding gas during non-welding. In the technology disclosed in this Japanese Patent Laid Open, a timer starts counting time synchronously with the opening of a solenoid valve for supplying and stopping the shielding gas by operation of a gas check switch. After a time-out period set in the timer is achieved, the solenoid valve is closed to stop the shielded gas supply even if the gas check switch is left set to the supply position of the shielded gas. As a result, the disclosed apparatus has an effect of preventing expensive shielding gas from being uselessly consumed even if the gas check switch is not return to the "stop" side.

However, in a case of a welding power source disclosed in Japanese Patent Laid Open No. 11-77309 supplying or stopping the shielding gas is performed only by the welding power source. Thus, a problem may occur when the welding power source is used for the arc welding apparatus comprising a combination of the welding power source and a teaching playback robot without any adjustment.

For example, for adjusting a shielding gas flow rate with the shielding gas flow rate adjuster, an operator must perform the following processes:

setting a gas check switch on the welding power source to the "supply" side to open a gas solenoid valve into a gas supply state;

adjusting the shielding gas flow rate to a desired value with the shielding gas flow rate adjuster at the position of the shielding gas flow rate adjuster;

returning the gas check switch to the "stop" side again at the position of the welding power source; and closing the gas valve to stop the supply of the shielding gas.

The operator must troublesomely perform the adjustment before every welding.

The welding power source disclosed in the Japanese Patent Laid Open, as discussed above, is used for automatically closing the gas valve to stop the supply of the shielding gas when the timer achieves the set time-out period even if the gas check switch is forgotten about and not returned to the stop side. This function is useful as a measure to counter forgetfulness. However, this function may unfortunately allow the operator to leave the check switch as it is without noticing that he or she has forgotten to return the check switch to the "stop" side.

Additionally, the entire stop mechanism of shielding gas supply is hardware. When the return of the check switch is forgotten, the check switch is left set to the gas supply side while an input switch on the welding power source side is turned off and then turned on. The non-operation of the switch prohibits a trigger from starting the counting of time by the timer, which results in continuing the shielding gas supply.

In an arc welding apparatus comprising a combination of a robot-only arc welding power source and the teaching playback robot, a robot controller side dominates the control of the shielding gas supply. Therefore, when the operator, during teaching for the robot, forgets to register a shielding gas control sequence or teaches an inappropriate sequence at the start or completion of the welding, a welding defect such as a blowhole disadvantageously occurs.

SUMMARY OF THE INVENTION

It is an object of the present invention to provide an arc welding apparatus comprising a combination of a teaching-playback robot and a welding power source, considering the conventional problems discussed above. This arc welding apparatus does not require any adjustment for providing consistency between a robot controller and the arc welding power source, even when replacement of one arc welding power source for one welding method to another welding power source for another welding method is performed during changing the welding method.

The arc welding apparatus in accordance with the present invention comprises a teaching-playback robot comprising a robot body and a robot controller, and a welding power source including a controller. The robot controller and the welding power source both have an external interface, and can communicate with each other using a digital signal. Based on information on the welding method transmitted from the welding power source, the welding method is automatically set in the robot controller.

Even when the welding power source combined with the robot is replaced by the other welding power source for a different welding method, the robot controller corresponds to the latter welding power source on the basis of the information on the latter welding method sent from the latter welding power source. Therefore, an operator needs not adjust between the welding power source side and the robot controller side.

BRIEF DESCRIPTION OF THE DRAWINGS

FIG. 3(A) is an explanatory table for a part of a communication protocol from a robot controller to a welding power source in the arc welding apparatus in accordance with the exemplary embodiment 1.

FIG. 3(B) is an explanatory table for a part of a communication protocol from the welding power source to the robot controller in the arc welding apparatus in accordance with the exemplary embodiment 1.

FIG. 8(A) is a timing chart of the opening/closing of the gas valve at the start of the welding in an arc welding apparatus in accordance with an exemplary embodiment 4 of the present invention.

FIG. 8(B) is a timing chart of the opening/closing of the gas valve at the start of the welding in a conventional arc welding apparatus.

FIG. 9(A) is a timing chart of the opening/closing of the gas valve at the completion of the welding in an arc welding apparatus in accordance with an exemplary embodiment 5 of the present invention.

FIG. 9(B) is a timing chart of the opening/closing of the gas valve at the completion of the welding in the conventional arc welding apparatus.

DESCRIPTION OF THE PREFERRED EMBODIMENTS

Embodiments of the present invention will be described hereinafter with reference to the accompanying drawings.

Embodiment 1

Figure 2:
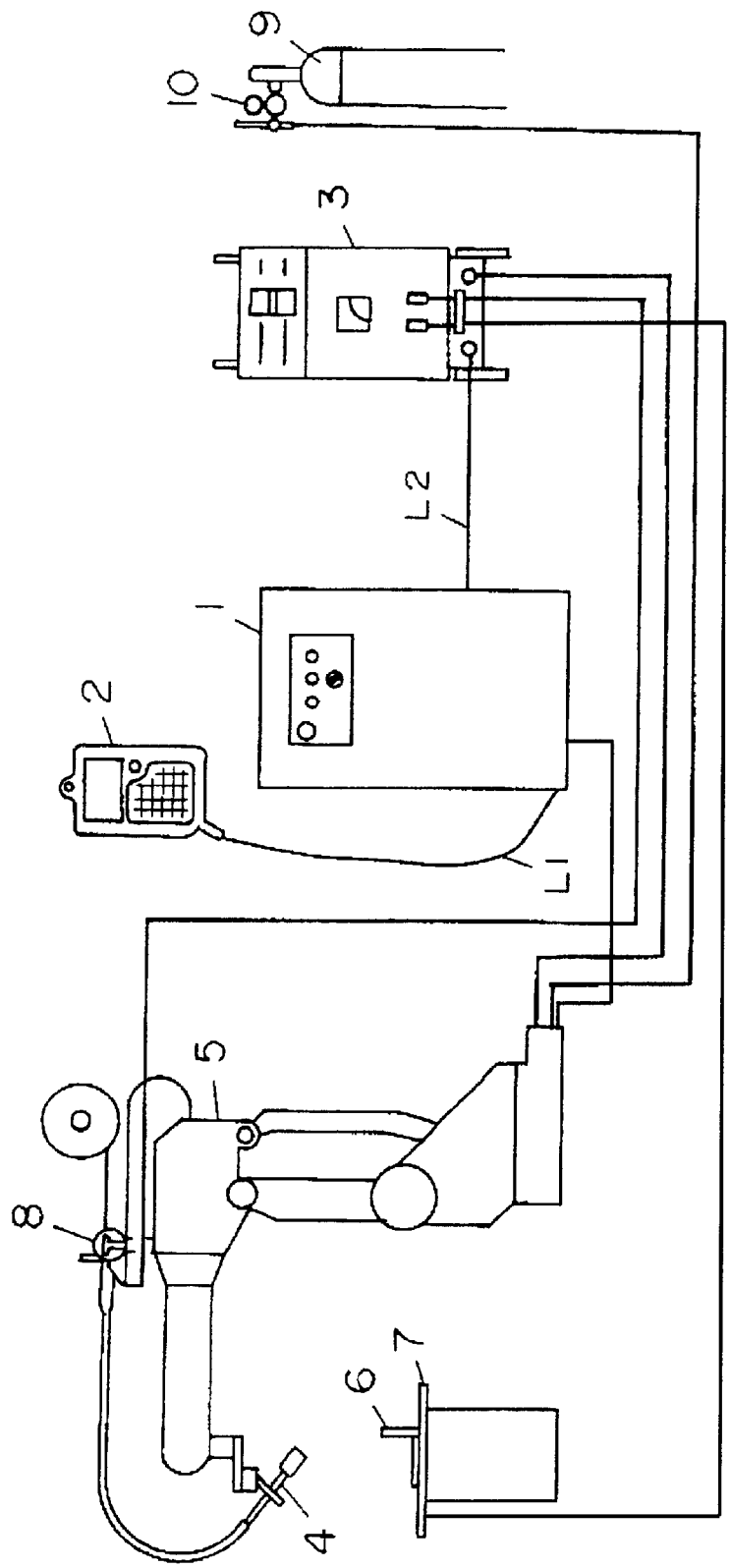
FIG. 2 is a schematic diagram of the configuration of the arc welding apparatus in accordance with the exemplary embodiment 1.

Referring now to FIG. 2, there is shown an entire configuration of an arc welding apparatus for performing arc welding by combining a teaching-playback industrial robot and a welding power source. Robot controller 1 in FIG. 2 includes a teach pendant 2 for teaching. Teach pendant 2 is connected to robot controller 1 through communication control line L1, and robot controller 1 is connected to welding power source 3 including a controller through communication control line L2. An operator, while directly looking at welding torch 4 located at an effect point of the industrial robot, finely moves robot body 5 and teaches tasks to be performed by the robot in an execution order using teach pendant 2. The operator fixes work 6, (which is to be welded) onto table 7, operates the teach pendant 2 to move the welding torch 4 to a welding start point (not shown). The operator then uses a welding register key on the teach pendant 2 to register the following information: teach position data; the fact that the present point of welding torch 4 is the welding start point; welding condition commands (welding current and welding voltage); and welding start commands (a sequence of supplying shielding gas, turning on a welding switch, and the like). The welding switch, which is embedded in the robot controller, is turned on to start the welding or turned off to finish the welding.

Next, the operator moves the welding torch 4 using the robot body 5 to a welding completion point (not shown) along a welding route, and teaches the route. The operator, at the welding completion point, teaches the teach position data and the fact that the present point is the welding completion point. Also, the operator uses a welding completion key on the teach pendant 2 to register crater welding condition commands (welding current and welding voltage) and welding completion commands (a sequence of turning off the welding switch, stopping the shielding gas supply, and the like).

Figure 1:
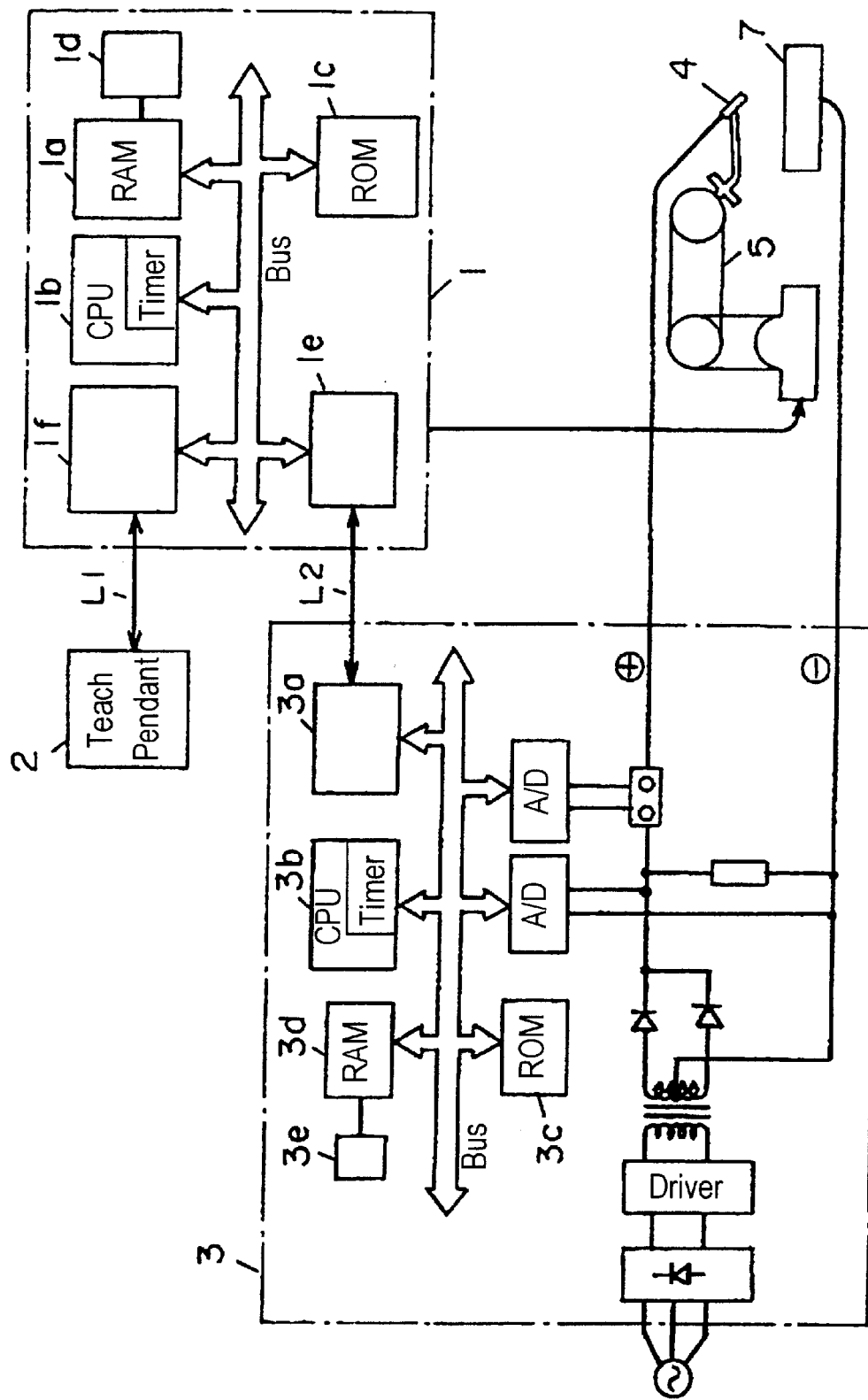
FIG. 1 is a block diagram showing a configuration of an arc welding apparatus in accordance with an exemplary embodiment 1 of the present invention.

Central processing unit (CPU) 1b shown in FIG. 1 stores the taught data as a program on random access memory (RAM) 1a responsive to an algorithm stored on read only memory (ROM) 1c. RAM 1a is a static RAM and can store the taught data and hold them by battery 1d even if a main power source is shut off. The program, the taught data, automatically operates the welding apparatus in FIG. 2.

When the robot body 5 moves the welding torch 4 to a predetermined welding start point of the work 6, the robot controller 1 transmits the previously stored welding conditions (welding current and welding voltage) to the welding power source 3 through communication control line L2, and then executes the welding start commands. When a response of the arc generation is returned from the welding power source 3, the robot controller 1 moves the welding torch 4 along the welding route of the work 6 and executes the arc welding at a taught and stored welding speed. When the welding torch 4 reaches the welding completion point, the robot controller 1 transmits the taught and stored crater welding condition commands (welding current and welding voltage), stops the robot, executes a crater process, and makes the welding torch 4 execute the welding completion commands. The robot controller then performs a known wire stick check, and when an expendable electrode (wire) is not fused with the work 6, proceeds to the next teaching point. The crater process means a welding for filling a crater (a recess) formed at the welding end with depositing metal.

Referring now to FIG. 1, there is shown transmission and control of signals between the robot controller 1 and the welding power source 3 in an arc welding apparatus of the present invention. FIG. 1 is a block diagram illustrating a control system of the arc welding apparatus comprising a combination of a teaching-playback robot and a welding power source. As shown in FIG. 1, the robot controller 1 and the welding power source 3 responsively have a communication controller 1e and a communication controller 3a as external interfaces, and communicate with each other using a digital signal.

After a main power source of the arc welding apparatus is turned on, the robot controller 1 and a controller in the welding power source 3 execute an initial process upon actuation. After the completion thereof, CPU 1b of the robot controller 1, in response to the algorithm on ROM 1c, transmits command cord "44h" representing "Good-morning (start of transmitting/receiving)" command to the welding power source 3 through the communication controller 1e responsive to a communication protocol shown in FIG. 3(A). Welding power source 3 receives the transmitted command with CPU 3b in response to the algorithm stored on ROM 3c through the communication controller 3a. When the receiving process is normal, the welding power source 3 transmits command cord "71h", which represents a communication protocol "communication acknowledge (ACK)" shown in FIG. 3(B), to the robot controller 1 through the communication controller 3a.

The communication protocols in FIG. 3(A) and FIG. 3(B) are respectively stored on ROM 1c and ROM 3c.

The hitherto transmitting/receiving shows an establishment of the communication control line L2 between the robot controller 1 and the welding power source 3. Next, the welding power source 3 transmits set wire diameter, welding method, wire material, and kind of wire to the robot controller 1. For example, it is assumed that the wire diameter is $\phi 1.2$, the welding method is $CO_2$, the wire material is mild steel, and the kind of wire is A. First, command cord "7Bh" and its accompanying data "40h" are continuously transmitted responsive to the communication protocol in FIG. 3(B). Reasons why the accompanying data of command cord "7Bh" is "40h" are as follows:

Only bit D6 is 1 in the accompanying data for wire diameter $\phi 1.2$, so that the accompanying data representing wire diameter $\phi 1.2$ is "4"; and All bits are 0 in the accompanying data for the $CO_2$ welding method, so that the accompanying data representing the $CO_2$ welding method is "0". Incidentally, the last digit "h" shows that the data is written in hexadecimal notation.

The robot controller recognizes in advance, referring to a value in column "W" in FIG. 3(B), that command cord "7Bh" has one word of accompanying data. The robot controller 1 receives accompanying data "40h" of the command cord as a set of command cord and accompanying data, and then transmits command cord "41h" as "communication ACK" to the welding power source 3. Here, command cord "41h" shows that this set of command cord and accompanying data is received. Similarly, the robot controller receives one word of accompanying data "00h" for command cord "7Ch" and then transmits command cord "41h" as "communication ACK" for the set of command cord and accompanying data to the welding power source 3. Reasons why the one word of accompanying data of command cord "7Ch" is "00h" are as follows:

all bits are 0 in the accompanying data for mild steel in wire material; and all bits are 0 in the accompanying data for "A" kind of wire.

Based on the command cords and their accompanying data transmitted from the welding power source 3, the welding method and the like corresponding to the welding power source are automatically set in the robot controller 1.

The welding method is specific to the welding power source and is fixed, but the wire diameter, the wire material, and the kind of wire, if necessary, can be changed by the communication through communication control line L2 using the teach pendant 2 of the robot controller 1. The set values after the change are stored on RAM 3d, namely, a static RAM of the welding power source 3. Information stored on RAM 3d is backed up by battery 3e and held even during a shutdown of the main power source.

Embodiment 2

Figure 4:
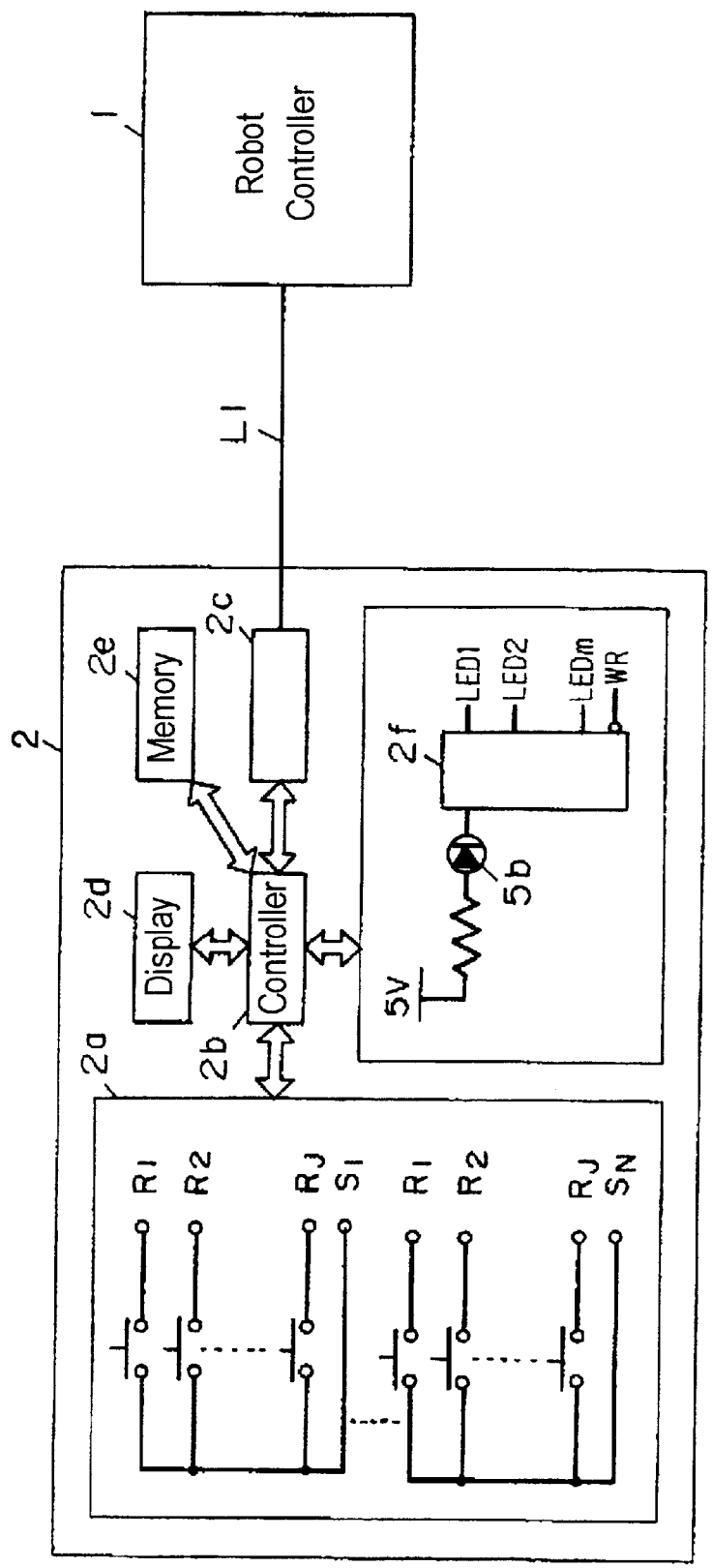
FIG. 4 is a block diagram showing an input switch and a lighting device in a teach pendant of an arc welding apparatus in accordance with an exemplary embodiment 2 of the present invention.

A manual control of shielding gas supply during the non-welding will be described with respect to an arc welding apparatus comprising a combination of the teaching-playback robot controller 1 and the welding power source 3 in accordance with the present invention. Referring now to FIG. 4, a main configuration of the teach pendant 2 on the robot controller 1 is shown.

The robot controller, as shown in FIG. 1, comprises RAM 1a, CPU 1b, ROM 1c, and teach pendant interface 1f for controlling communication with the teach pendant 2. The teach pendant 2, as shown in FIG. 4, comprises key-block 2a comprising instant ON contacts (pressed to be closed or released to be opened) for performing a robot operation, controller 2b for performing a key input process and the control of the entire teach pendant, a communication controller 2c for performing a communication process of data with the robot controller 1, display panel 2d, and memory 2e. CPU 1b in the robot controller 1 can recognize a state of each key in the key-block 2a through the controller 2b, the communication controller 2c, and the teach pendant interface 1f.

Figure 5:
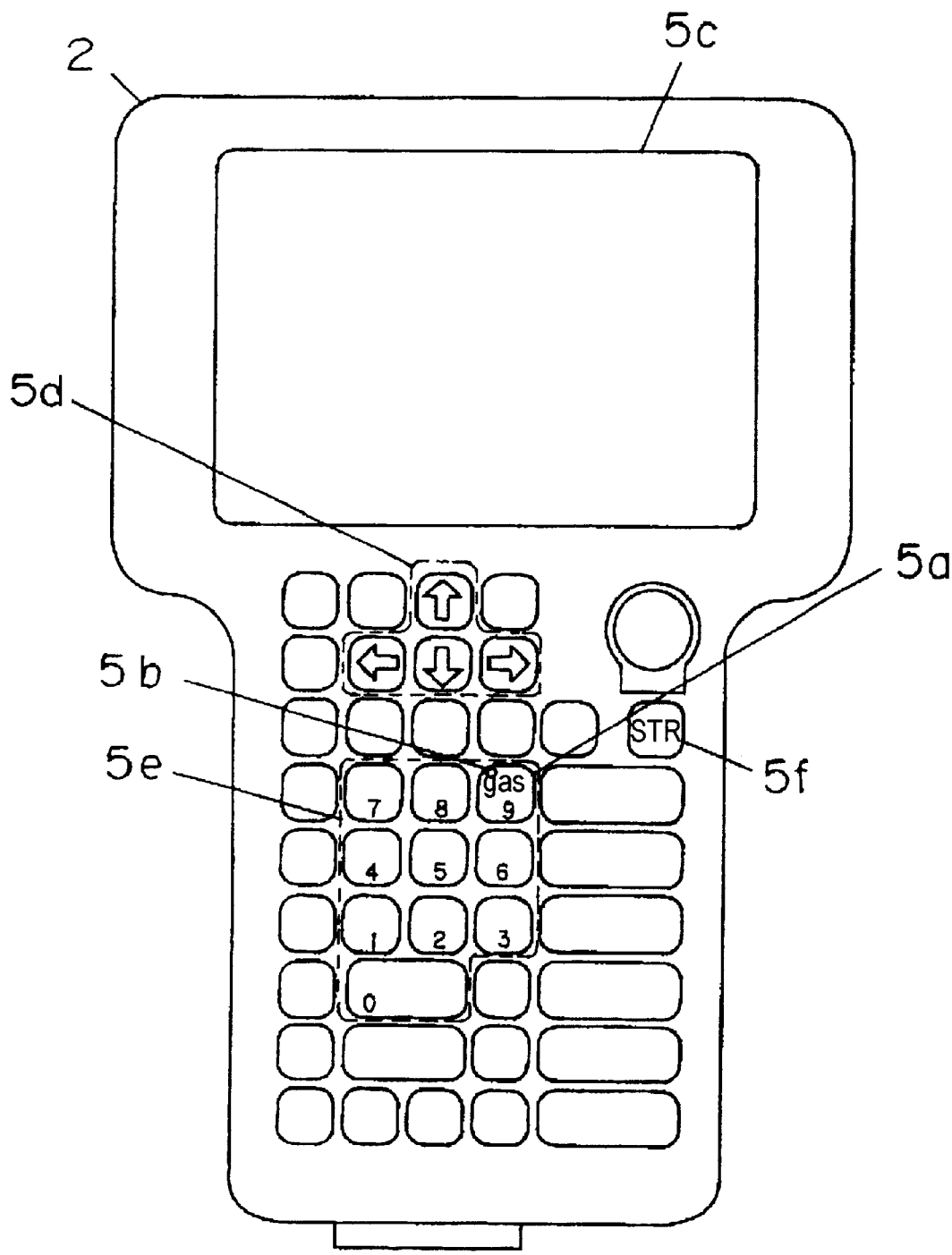
FIG. 5 is a front view of the teach pendant of the arc welding apparatus in accordance with the exemplary embodiment 2.

Referring now to FIG. 5, a key operation unit of the teach pendant 2 is shown. When an operator pushes "gas" key 5a in FIG. 5, only during the non-welding, the robot controller recognizes the pushed state of the "gas" key 5a of the teach pendant 2, starts to count time with a timer in CPU 1b synchronously with the pressed timing of the "gas" key 5a, and transmits a command (not shown) to the welding power source 3 so as to open gas valve 8 controlled by the welding power source 3. The gas valve 8 in this embodiment is located on the robot body 5 as shown in FIG. 2.

Figure 7:
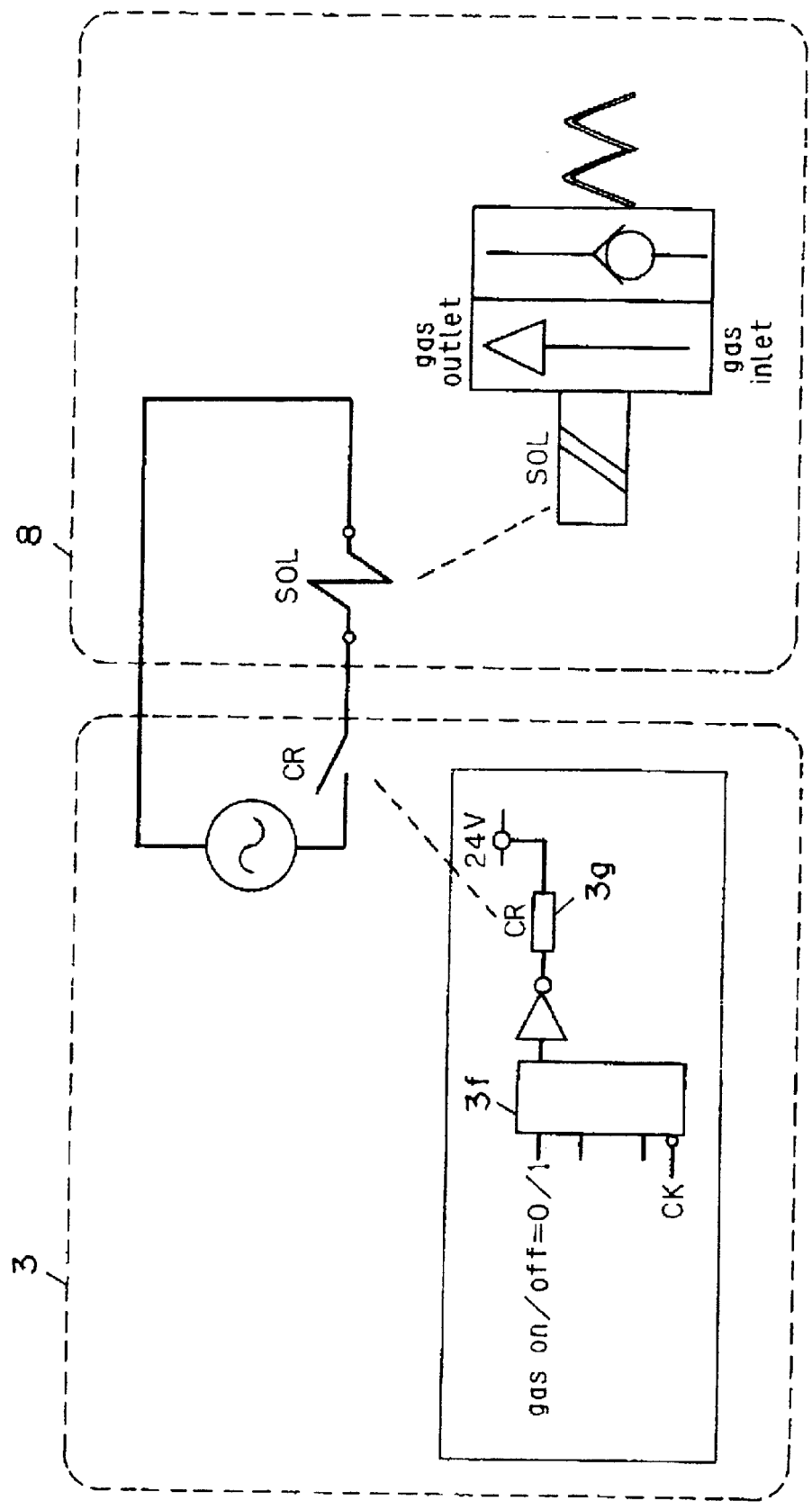
FIG. 7 is a hardware block diagram of a part for controlling the opening/closing of a gas valve in the arc welding apparatus in accordance with the exemplary embodiment 2.

Referring now to FIG. 7, a hardware configuration for controlling the gas valve 8 is shown. When the "gas" key 5a of the teach pendant 2 is pushed, CPU 3b of the welding power source 3 sets data into data bus "gas on/off=0/1" and then feeds a LOW logic pulse into a writing signal terminal CK to control relay CR. The data bus "gas on/off=0/1" is connected to a data input unit in the latch circuit 3f through a bus. When relay CR is excited, a contact of relay CR closes to energize solenoid SOL of the gas valve 8. Gas valve 8 opens upon energizing solenoid SOL, and shielding gas flows from "gas inlet" toward "gas outlet". Controlling the gas valve 8 as described above can supply and stop shielding gas.

One key in the key-block 2a shown in FIG. 4 is assigned as the "gas" key 5a of the teach pendant 2 in FIG. 5. When the "gas" key 5a is pushed, CPU 1b in FIG. 1 stores a value (state) logically showing "1" on a memory region in RAM 1a that is assigned for recognizing the state of the key. When the key is pushed again, CPU 1b replaces the value by a value logically showing "0". In other words, every time the "gas" key 5a is pushed, CPU 1b replaces the value in the memory region like 1, 0, 1, 0.

The teach pendant 2, as shown in FIG. 4 and FIG. 5, includes an LED 5b corresponding to the "gas" key 5a. CPU 1b controls turning on/off of the LED 5b through the teach pendant interface 1f, the communication controller 2c, and the controller 2b. The controller 2b sets data into data buses LED 1, LED 2, ..., LED m, then feeds a LOW logic pulse into a writing signal terminal WR, and turns on or off LED 5b corresponding to the "gas" key 5a. Data buses LED 1, LED 2, ..., LED m are connected to a data input unit in the latch circuit 2f through buses. CPU 1b inverts the logic stored in RAM 1a every time the "gas" key 5a is pushed. When the value in the memory region assigned for recognizing the state of the "gas" key 5a is "1" CPU 1b turns on the LED 5b, and when the value is "0" CPU 1b turns off the LED 5b.

The value in the memory region that inverts its logic for each pushing of the "gas" key 5a depends on not only the input of the "gas" key 5a but also an actual opening/closing state of the gas valve. In other words, when a sequence command during driving of the robot generates a command for opening or closing a gas valve, the command also changes the value in the memory region.

The operator, during the operation of the "gas" key 5a, can recognize an opening/closing state of the gas valve; "open" when the LED 5b is turned on, or "close" when the LED 5b is turned off. The operator can thus easily adjust gas flow rate at the start of the working by going to a place of flow rate adjuster 10 with the teach pendant 2.

A switch that has an instant close contact and is not directly connected to the solenoid SOL of the gas valve is used as a gas check switch, and a normally close type valve is used as the gas valve 8. The solenoid SOL therefore goes into non-excitation state when the main power source is shut off, so that the gas valve 8 closes to stop the supply of shielding gas for arc welding. Even if the main power source of the arc welding apparatus is shut off during the shielding gas supply, the supply of the shielding gas is automatically stopped in this structure.

Embodiment 3

A shielding gas control during non-welding will be described with respect to an arc welding apparatus comprising a combination of teaching-playback robot controller 1 and the welding power source 3. In this arc welding apparatus, the robot controller 1 and the welding power source 3 respectively have the communication controller 1e and the communication controller 3a as external interfaces, and communicate with each other using a digital signal.

A circuit shown in FIG. 7 controls and opens the gas valve 8 synchronously with an operator ON operation of the "gas" key 5a at an instant ON contact on the teach pendant 2 on the robot controller side. The gas valve 8 controls shielding gas supply for welding under the control of the welding power source 3. When the "gas" key 5a is pushed, the CPU 1b on the robot controller 1 shown in FIG. 1 stores a value logically showing "1" (represents a gas supply state) on a memory region assigned for recognizing the state of the key. Synchronously with this storing, a timer in the CPU 1b starts counting time, and the CPU 1b makes the controller 2b turn on the LED 5b on the teach pendant 2 through the communication control line L1.

After the time counting operation by the timer in the CPU 1b finishes, the robot controller 1 transmits a signal for closing the gas valve 8 (for stopping gas supply) to the welding power source 3 during the non-welding even while the LED 5b has been in a gas supply state. In other words, the gas supply stops even if an operation for stopping the gas supply has not been performed with the "gas" key 5a. At this time, the CPU 1b stores "0" on the memory region and turns off the LED 5b deposited on the teach pendant 2. The timer on the robot controller 1 thus starts counting time synchronously with the setting of the opening of the gas valve 8 by the "gas" key 5a, and the gas valve is closed after a predetermined period, during the non-welding even in the gas supply state.

Therefore, even when the operator operates the "gas" key 5a to supply gas during a check of the gas flow rate and then forgets about an operation for stopping the gas supply with the "gas" key 5a, the gas supply automatically stops. This prevents useless supply of the shielding gas.

Figure 6:
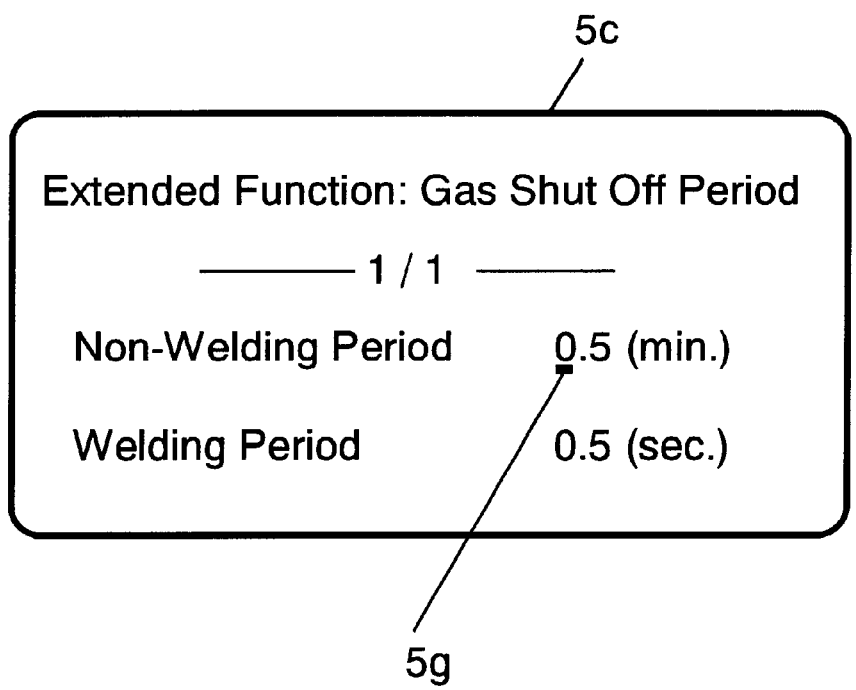
FIG. 6 is an explanatory drawing of a liquid crystal screen of the teach pendant for setting a predetermined time at which shielding gas is shut off.

The operator, using the teach pendant 2, sets the time counting period of the timer in the CPU 1b that starts synchronously with the ON operation of the "gas" key 5a. FIG. 6 shows a screen used for setting the period as a gas shut-off period (a period until gas shut-off) with the teach pendant 2. First for setting a predetermined period during the non-welding of the present invention as a predetermined period until the shielding gas shuts off, the operator operates the teach pendant 2 to display a contents screen shown in FIG. 6 on a liquid crystal display screen of the teach pendant 2. An algorithm for this operation and a screen design are stored on ROM 1c.

When the contents shown in FIG. 6 are displayed on the liquid crystal display screen 5c in the teach pendant in FIG. 5, the cursor 5g originally lies at the position "0" of "0.5 (min.)". The operator shifts cursor 5g to a desired digit position with "cursor shift" key 5d shown in FIG. 5, and then inputs a figure using "digit key group" 5e. A figure displayed at the time when "store" key 5f is pushed serves as the counting period. Each set value is stored and held on the RAM 1a. The RAM 1a is backed up by the battery 1d, and the stored data can be held even while the main power source of the arc welding apparatus is shut off.

Embodiment 4

A control sequence of shielding gas at the start of welding will be described.

In an arc welding apparatus comprising a combination of the teaching-playback robot controller 1 and the welding power source 3 in accordance with the present invention, as shown in FIG. 1 and FIG. 2, the robot controller 1 and the welding power source 3 respectively have the communication controller 1e and the communication controller 3a as external interfaces, and communicate with each other using a digital signal. When welding torch 4 located at an effect point of the industrial robot body 5 reaches a welding start point (not shown) of the work 6 to be welded that is fixed onto table 7, the robot controller 1 transmits to the welding power source 3 welding condition commands (welding current and welding voltage) and welding start commands (a sequence of supplying shielding gas, turning on a welding switch, and the like) and starts the welding.

Referring now to FIG. 8(A) and FIG. 8(B), the present embodiment (FIG. 8(A)) and a conventional example (FIG. 8(B)) will be described comparing them with each other. The robot controller 1 in a conventional arc welding apparatus dominates the control of commands related to welding control. In the conventional example in FIG. 8(B), "gas control signal on robot controller side" is generated for period t1, and synchronously with this generation "gas valve open signal" is generated for period t2 to supply shielding gas for period t2. In this case, "gas control signal on welding power source side" ON of the welding power source 3 caused by the command "welding switch" ON from the robot controller 1 is neglected. In other words, period t2 depends on period t1, and period t2 is controlled so that period t2 certainly starts synchronously with the start of period t1. Accordingly, when an operator fails the operation, shielding gas is not supplied at the start of the welding, which causes a welding working failure. The operation misses by the operator comprise the following misses:

Forgetting about registration of a "gas control signal on robot controller side" ON sequence at the start of the welding;

Accidentally deleting the sequence during an editing operation of teaching data; and Setting an unsuitable sequence (for example, a sequence in which "gas control signal on the robot controller side" is turned on at a time lag after turning on the welding switch.)

An arc welding apparatus of the present invention, as shown in FIG. 8(A), uses "gas control signal on welding power source side" of the welding power source 3 synchronous to the "welding switch" ON command at the start of the welding. The arc welding apparatus also opens a gas valve to start the shielding gas supply, depending on an OR state of an ON signal of "gas control signal on welding power source side" and an ON signal of "gas control signal on robot controller side" of the robot controller 1 generated for period t1. In this case, "gas control signal on robot controller side" is in the ON state for period t3, so that shielding gas supply certainly is in the ON state.

Even when an operator fails the operation, "gas control signal on welding power source side" turns on synchronously with "welding switch" ON as timing of finishing t3, so that the shielding gas is certainly supplied to prevent a welding working failure. The operation misses by the operator, as discussed above, comprise the following misses:

Forgetting about registration of a "gas control signal on robot controller side" ON sequence at the start of the welding;

Accidentally deleting "gas control signal on robot controller side" during an editing operation of teaching data; and Setting an unsuitable sequence.

The arc welding apparatus of the present embodiment starts to supply shielding gas, by opening the gas valve at the start of the welding depending on an OR state of the gas valve open command on the welding power source 3 and the gas valve open command on the robot controller 1 that is sent for period t1. Incidentally, the gas valve open command on the welding power source 3 is synchronous with the "welding switch" ON command from the robot controller 1.

Embodiment 5

A control sequence of shielding gas at the completion of welding will be described. In an arc welding apparatus comprising a combination of a teaching-playback robot and a welding power source in accordance with the present invention, a robot controller and the welding power source both have an external interface, and communicate with each other using a digital signal. The arc welding apparatus of the present invention operates opening/closing of a gas-valve with the welding power source depending on an open command or a close command of the gas valve from the robot controller, and performs an arc welding work according to teaching data taught to the robot by the operator. In addition, the arc welding apparatus, at the completion of the welding, stops the supply of shielding gas by closing the gas valve depending on an AND state of a welding completion state on the welding power source and a gas valve close command on the robot controller. The welding completion state starts in response to a welding switch OFF command.

When the welding torch 4 located at an effect point of the industrial robot body 5 reaches a welding completion point (not shown) of the welded work 6 that is fixed onto the table 7, the robot controller 1 transmits to the welding power source 3 crater welding condition commands (welding current and welding voltage) and welding completion commands (a sequence of turning off a welding switch, stopping the shielding gas supply, and the like) and finishes the welding.

Referring now to FIG. 9(A) and FIG. 9(B), the present embodiment will be described in detail. FIG. 9(A) shows an operation sequence in accordance with the present invention and FIG. 9(B) shows a conventional operation sequence.

Robot controller 1 dominates the welding control in a conventional arc welding apparatus. In the conventional example in FIG. 9(B), "gas control signal on robot controller side" is generated for period t5, and "gas valve close signal" is generated upon the completion of period t6 to stop the supply of shielding gas at this time. In this case, "gas control signal on welding power source side" OFF of the welding power source 3 after the completion of a burn back process (period t4) starting with a "welding switch" OFF command from the robot controller 1 is neglected. In other words, period t6 depends on period t5, and period t6 is controlled so that period t6 certainly starts synchronously with the start of period t5. Accordingly, when an operator sets "gas control signal on robot controller side" OFF sequence at the completion of the welding to an unsuitable sequence, the burn back process (period t4) is performed in an atmosphere without shielding gas. This generates a blowhole or the like and causes a welding working failure. Here, the operator unsuitable setting, for example, includes setting a sequence in which "gas control signal on robot controller side" is turned off before turning off the welding switch. The burn back process described above means a process of continuing to apply a low welding voltage between a torch and a base material for a short period after the welding switch is turned off. Because a consumable electrode is supplied due to inertia and the arc continues even after the welding switch is turned off, rapid stop of the application of the welding voltage during the arc continuation causes the consumable electrode to stick into the base material.

An arc welding apparatus of the present invention, as shown in FIG. 9(A), at the completion of the welding, uses "gas control signal on welding power source side" OFF after the completion of a burn back process on welding power source 3 side. The burn back process starts with "welding switch" OFF command. The arc welding apparatus also closes a gas valve to stop shielding gas supply, depending on an AND state of an OFF signal of "gas control signal on welding power source side" and an OFF signal (gas valve close command) of "gas control signal on robot controller side" from robot controller 1. Thus, the supply of shielding gas is stopped after the completion of period t7.

Accordingly, even when an operator sets and registers an unsuitable "gas control signal on robot controller side" OFF sequence at the completion of the welding, the shielding gas supply is stopped only after the completion timing of period t4 after the burn back process. This prevents a welding working failure.

The arc welding apparatus of the present invention, as discussed above, closes the gas valve to stop the shielding gas supply, depending on an AND state of the completion state of the burn back process on the welding power source side that starts with the welding switch OFF command (i.e. the OFF state of "gas control signal on welding power source side") and gas valve close command on the robot controller side.

Embodiment 6

It is an object of this embodiment to prevent useless supply of shielding gas even when an operator misses registration of a "gas control signal on robot controller side" OFF sequence at the completion of the welding, accidentally deletes the sequence during an editing operation of teaching data, or sets an unsuitable sequence.

In an arc welding apparatus in accordance with the present embodiment comprising a combination of a teaching-playback robot and a welding power source, a robot controller and the welding power source both have an external interface, and communicate with each other using a digital signal. The arc welding apparatus operates opening/closing of a gas valve with the welding power source depending on an open command or a close command of the gas valve from the robot controller, and performs an arc welding working according to teaching data taught to the robot by the operator. Even when any gas valve close command is not sent from the robot controller after welding switch OFF is commanded at the completion of the welding, the arc welding apparatus makes a timer on the welding power source start counting time, and closes the gas valve after a predetermined period to stop the shielding gas supply. The start of the time counting is synchronous with the completion (i.e. turning off "gas control signal on welding power source side") of a burn back process on the welding power source that starts with the welding switch OFF command.

When the welding torch 4 located at an effective point of the industrial robot body 5 reaches a welding completion point (not shown) of the welded work 6 that is fixed onto table 7, the robot controller 1 transmits to the welding power source 3 crater welding condition commands (welding current and welding voltage) and welding completion commands (a sequence of turning off a welding switch, stopping the shielding gas supply, and the like) and finishes the welding.

An arc welding apparatus of embodiment 5, as shown in FIG. 9(A), at the completion of the welding, closes the gas valve to stop the shielding gas supply depending on an AND state of an OFF signal of "gas control signal output on welding power source side" after the burn back process on the welding power source 3 and an OFF signal (gas valve close command) of "gas control signal output on robot controller side" from robot controller 1. The burn back process starts with a "welding switch" OFF command. If an operator forgets about the registration of the "gas control signal output on robot controller side" OFF sequence at the completion of the welding, the "gas control signal output on robot controller side" OFF signal is not generated. Therefore, the AND state of the OFF signal of "gas control signal output on welding power source side" and the OFF signal (gas valve close command) of "gas control signal output on robot controller side" from the robot controller 1 does not become 1, so that the shielding gas supply is not stopped. Such case does not cause any welding working failure, but uselessly consumes the shielding gas regardless of the welding working. The arc welding apparatus of this embodiment is used for preventing useless consumption of the shielding gas regardless of the welding working even when the operator forgets about registration of the "gas control signal on robot controller side" OFF sequence at the completion of the welding.

At the completion of the welding in FIG. 9(A), the timer in CPU 3b starts counting time for a predetermined period synchronously to a "gas control signal on welding power source side" OFF timing after the burn back process on the welding power source 3 that starts with the "welding switch" OFF command.

If the time counting operation is completed without the "gas control signal on robot controller side" OFF sequence at the completion of the welding, CPU 3b of the welding power source 3 forcibly closes the gas valve (i.e. stop of gas supply) with a circuit shown in FIG. 7 during non-welding even in the gas supply state. The CPU 3b also notifies the robot controller 1 of the closing of the gas valve through communication control line L2. The CPU 1b of the robot controller 1 replaces the value in a memory region of the RAM 1a that represents an actual opening/closing state of the gas valve by "0" representing the closing state of the gas valve, and also turns off the LED 5b on the teach pendant 2. In addition, the CPU 1b displays a warning (not shown) of no gas OFF sequence on a liquid crystal screen. At this time, the robot operation is not stopped but continued.

If an operator forgets about the registration of the "gas control signal on robot controller side" OFF sequence, the gas valve close command on the robot controller 1 does not exist. The arc welding apparatus with a structure discussed above, however, makes the timer of the welding power source 3 start the counting time synchronously with the completion of the burn back process of the welding after the welding switch OFF command is sent, and forcibly closes the gas valve after a predetermined period to stop the shielding gas supply. This can prevent useless consumption of the shielding gas regardless of the welding working.

The time counting period (a period until stop of the gas supply) of the timer of the welding power source 3 will be hereinafter described.

The operator, using the teach pendant 2, sets the time counting period of the timer of the welding power source 3. Referring now to FIG. 6, there is shown a screen used for setting the period as a gas shut-off period with the teach pendant 2. First for setting a predetermined period, the operator operates the teach pendant 2 to display screen 5c shown in FIG. 6 on a liquid crystal display screen on the teach pendant 2. The time counting period in accordance with the present embodiment is displayed in seconds as a shut-off period of the shielding gas during the welding like "during welding 0.5 (sec.)" on screen 5c on the teach pendant 2. Cursor 5g originally lies at the position "0" of "during non-welding 0.5 (min.)". The operator shifts the cursor 5g to a desired digit position on the "during welding 0.5 (seconds)" side with "cursor shift key" 5d shown in FIG. 5, and then inputs a figure using the "digit key group" 5e. A figure displayed at the time when "store key" 5f is pushed serves as the time counting period. Each set value is transmitted to the welding power source 3 through the communication control line L2, and stored and held as data of the time counting period on the RAM 3d. The RAM 3d is backed up by battery 3e, and the stored data can be held even when the main power source of the arc welding apparatus is shut off.

Figure 10:
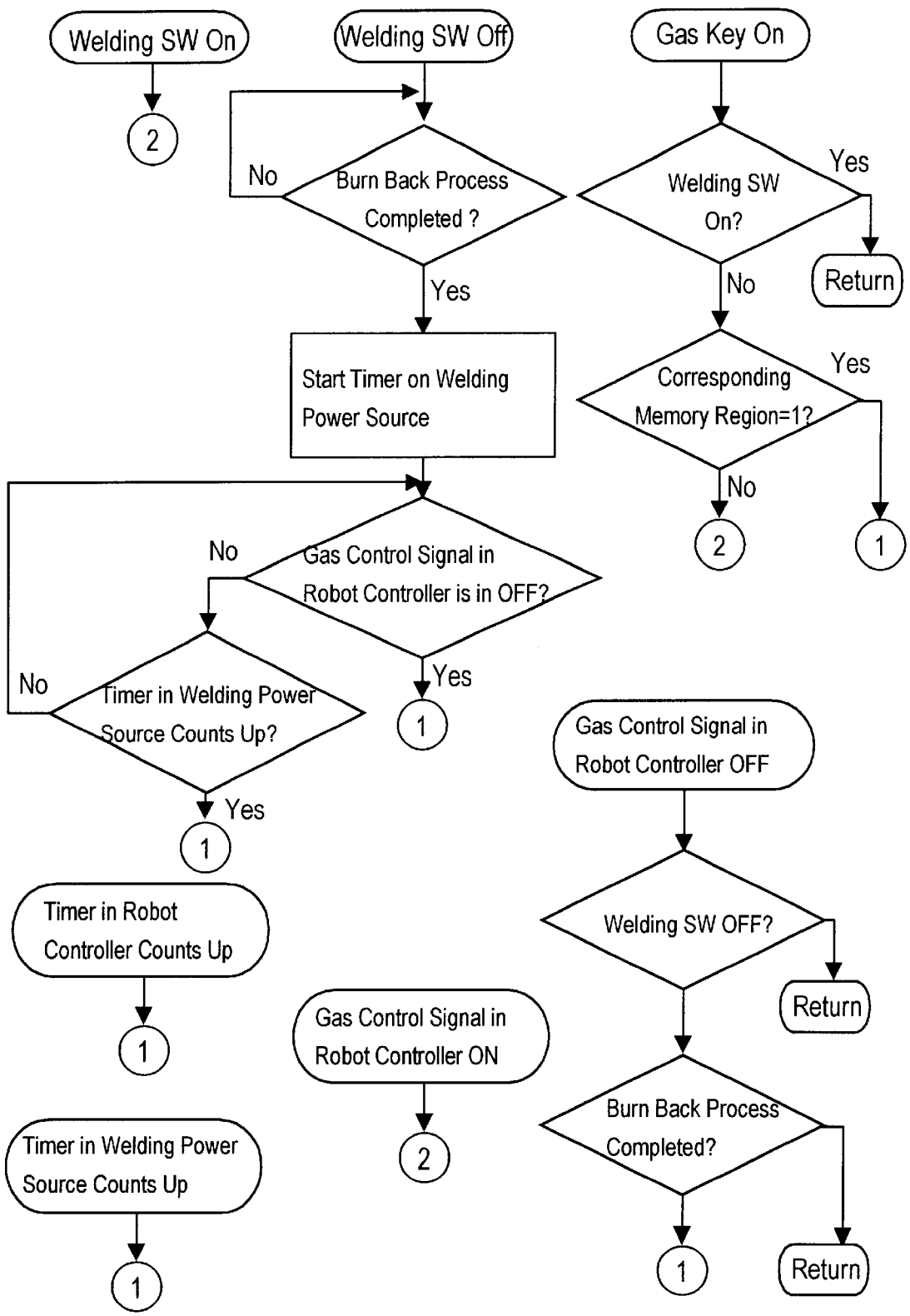
FIG. 10 shows an algorithm of an operation of the arc welding apparatus in accordance with the present invention.
Figure 11:
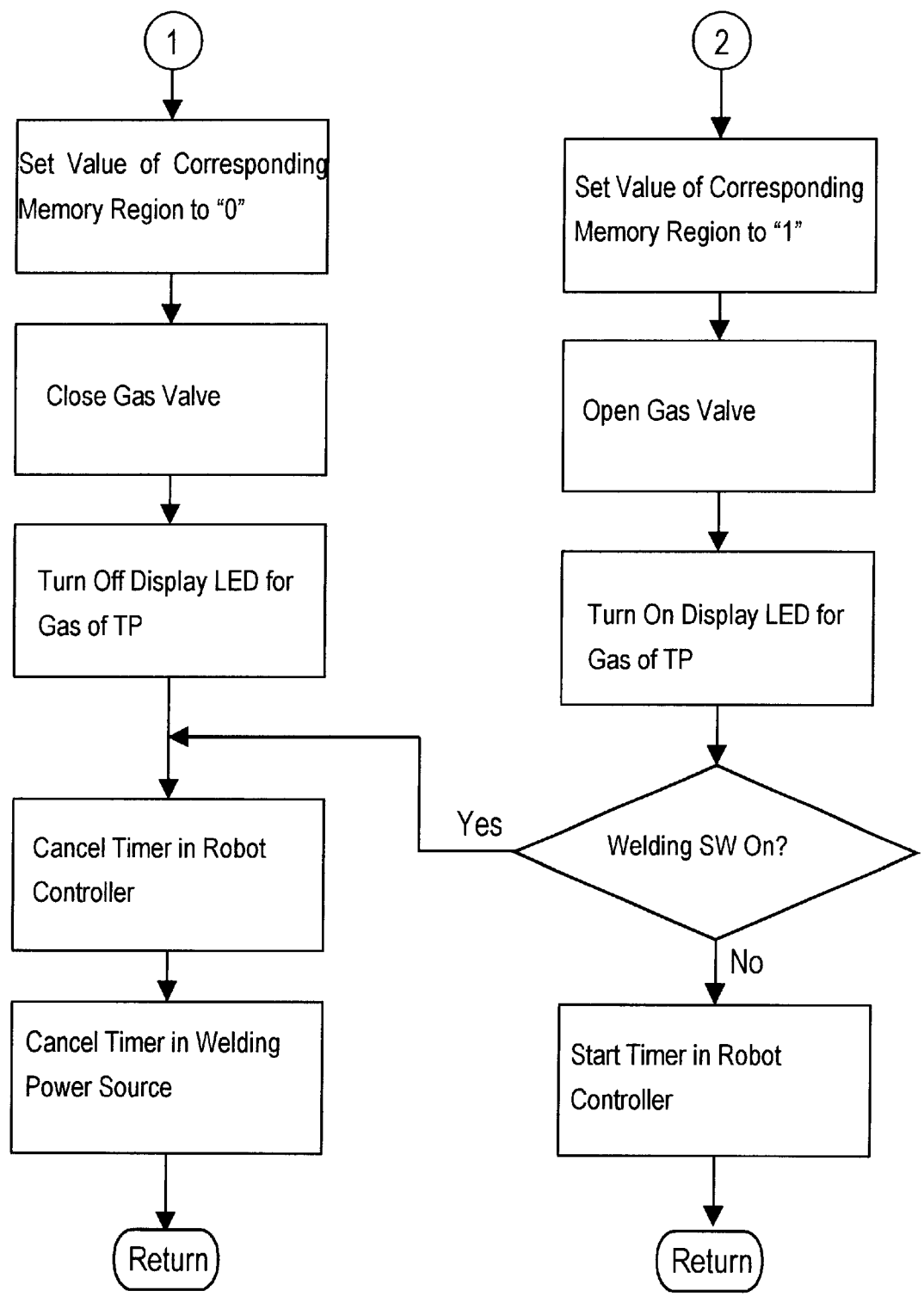
FIG. 11 shows an algorithm of the operation of the arc welding apparatus in accordance with the present invention.

Referring now to FIG. 10 and FIG. 11, flow charts of algorithms of respective inventions from embodiment 2 through embodiment 6 are shown. Steps represented by circled figures in FIG. 10 are continued to steps with the same figures in FIG. 11.

Individual flow of each algorithm is not described because the contents are the same as discussed above. The software processes comprise multiple tasks and are driven by respective events, namely, in "event driven" types.

What is claimed is:

1. An arc welding apparatus comprising:
   a teaching-playback robot comprising a robot body and a robot controller;

a welding power source including a controller;

a first external interface located in said robot controller; and a second external interface located in said controller of said welding power source, wherein said first and second external interfaces are operable to communicate with each other using a digital signal, and said second external interface is operable to send information about a welding method to said first external interface, and said robot controller is operable to set conditions to execute the welding method based on the information.

2. An arc welding apparatus comprising:

a teaching-playback robot comprising a robot body and a robot controller;

a welding power source including a controller;

a switch located in the robot controller;

a gas valve operable to control a shielding gas supply synchronously with a gas-valve-open operation of said switch; and a timer located in said robot controller for starting a time counting synchronously with the gas-valve-open operation of said switch, wherein said gas valve is operable to stop the shielding gas supply after a predetermined period of time counting by said timer.

3. The arc welding apparatus according to claim 2, further comprising:

setting means for setting the predetermined period; and a RAM operable to store the predetermined period.

4. The arc welding apparatus according to claim 2, further comprising:

setting means for setting the predetermined period;

a RAM operable to store the predetermined period; and a battery operable to back up said RAM, wherein said RAM is operable to store data even during a shutdown of power supply.

5. The arc welding apparatus according to claim 2 wherein said gas valve is a normally-close-type solenoid valve.

6. An arc welding apparatus comprising:

a teaching-playback robot comprising a robot body and a robot controller operable to output a first gas control signal which is capable of having either an ON level or an OFF level at a time;

a welding power source including a controller operable to output a second gas control signal which is capable of having either an ON level or an OFF level at a time;

a gas valve operable to open or close based on a received command; and a welding switch operable to send an ON signal to start a welding, wherein said controller of said welding power source is operable to set the second gas control signal to the ON level synchronously with the ON signal of said welding switch, and to output a command to said gas valve to open when either of the first and second gas control signals are at the ON level.

7. The arc welding apparatus according to claim 6 wherein said gas valve is a normally-close-type solenoid valve.

8. An arc welding apparatus comprising:

a teaching-playback robot comprising a robot body and a robot controller operable to output a first gas control signal which is capable of having either an ON level or an OFF level at a time;

a welding power source including a controller operable to output a second gas control signal which is capable of having either an ON level or an OFF level at a time; and a gas valve operable to open or close based on a received command, wherein said controller of said welding power source is operable to set the second gas control signal to the OFF level at a completion of a burn back process of said welding power source and to output a command to said gas valve to close when both the first and second gas control signals are at the OFF state.

9. The arc welding apparatus according to claim 8 wherein said gas valve is a normally-close-type solenoid valve.

10. An arc welding apparatus comprising:

a teaching-playback robot comprising a robot body and a robot controller;

a welding power source including a controller; and a gas valve operable to open or close based on a valve open/close command from said robot controller; and a timer for starting a time counting synchronously with a completion of a burn back process of said welding power source;

wherein said gas valve is operable to close after a predetermined time period of time counting of said timer.

11. The arc welding apparatus according to claim 10 wherein said gas valve is a normally-close-type solenoid valve.

12. The arc welding apparatus according to claim 10, further comprising:

setting means for setting the predetermined period; and a RAM operable to store the predetermined period.

13. The arc welding apparatus according to claim 10, further comprising:

setting means for setting the predetermined period;

a RAM operable to store the predetermined period; and a battery operable to back up said RAM, wherein said RAM is operable to store data even during a shutdown of power supply.

14. An arc welding apparatus comprising:

a teaching-playback robot comprising a robot body and a robot controller;

a welding power source including a controller;

a gas valve operable to control a shielding gas supply;

a teaching device operable to teach an operation program; and a key located on said teaching device, wherein a push on said key causes said key to provide an instruction for opening or closing of said gas valve, and during non-welding said key toggles, with successive pushes of said key, between the instruction for opening and the instruction for closing of said gas valve.

15. The arc welding apparatus according to claim 14 wherein said gas valve is a normally-close-type solenoid valve.

* * * * *